United States Patent [19]
Haraga et al.

[11] Patent Number: 6,083,604
[45] Date of Patent: Jul. 4, 2000

[54] BONDED ASSEMBLY, METHOD OF JOINTING FOR PREPARATION THEREOF AND RIVET

[75] Inventors: Kosuke Haraga; Naoki Yagi, both of Amagasaki; Yoshinobu Nakashima, Nagasaki; Yuzi Ganryu, Kobe; Tsutomu Sasaki; Atsushi Takimoto, both of Amagasaki; Yosiro Komazawa, Chiyoda-ku; Asao Okuda, Inazawa; Shoji Takagi; Akifumi Matsukawa, both of Marugame; Hideaki Urata, Wakayama; Yasushi Kawashima, Nagoya; Kazumi Masuo, Kamakura; Kenji Honma, Koriyama; Isao Ikeda, Nagasaki, all of Japan

[73] Assignee: Mitsubishi Denki Kabushiki Kaisha, Tokyo, Japan

[21] Appl. No.: 08/545,276

[22] Filed: Oct. 19, 1995

[30] Foreign Application Priority Data

Oct. 26, 1994 [JP] Japan ..................................... 6-262303

[51] Int. Cl.[7] ................................. F16B 1/48; B32B 3/26
[52] U.S. Cl. .......................... 428/132; 428/133; 428/161; 428/162; 428/139; 428/140; 403/375; 403/381
[58] Field of Search .................... 428/132, 133, 428/161, 162, 139, 140; 403/375, 381; 156/293

[56] References Cited

U.S. PATENT DOCUMENTS

| | | | |
|---|---|---|---|
| 4,336,678 | 6/1982 | Peters .......................................... | 52/729 |
| 4,564,550 | 1/1986 | Tschudin-Mahrer ..................... | 428/159 |
| 4,865,894 | 9/1989 | Shubow ..................................... | 428/59 |
| 5,019,196 | 5/1991 | McKibben et al. ........................ | 156/91 |
| 5,075,150 | 12/1991 | Webb et al. ............................... | 428/162 |
| 5,165,816 | 11/1992 | Parasin ...................................... | 403/334 |
| 5,267,425 | 12/1993 | Onysko et al. ............................ | 52/729 |

FOREIGN PATENT DOCUMENTS

| | | |
|---|---|---|
| 17 99 027 | 10/1959 | Germany . |
| 12 52 975 | 10/1967 | Germany . |
| 19 96 268 | 1/1971 | Germany . |
| 29 15 417 | 10/1980 | Germany . |
| 94 09 731 | 10/1994 | Germany . |

(List continued on next page.)

OTHER PUBLICATIONS

Japan Adhesion Association, vol. 25, No. 8, (Jan. 1989), pp. 299–305 (English Abstract).

H. Ruegsegger, Zeitschrift für Schweisstechnik/Journal de la Soudure, vol. 59, No. 9, Sep. 10, 1969, pp. 261–264, "Für Den Konstrukter—Hinweise Zur Klebgerechten Gestaltung Einfacher Blech–Und Rohrkonstruktionen".

*Primary Examiner*—William Watkins
*Attorney, Agent, or Firm*—Oblon, Spivak, McClelland, Maier & Neustadt, P.C.

[57] ABSTRACT

The present invention relates to a bonded assembly characterized in that a board having a convexed portion on a jointing surface thereof and a board having, on a jointing surface thereof, a concaved portion or a through hole to be engaged with the convexed portion are jointed with adhesives. Also, the present invention relates to a bonded assembly characterized in that an adhesive is coated on the portion other than the convexed portion of the board so that the coating thickness is smaller than the height of the convexed portion, and then the board is jointed to another board having a concaved portion or a through hole, after making alignment of the boards. Further, the present invention relates to a rivet having means for fitting to and temporarily fixing to an inserting through hole, and a method of jointing boards which comprises a step for inserting, fitting and temporarily fixing the rivet having the means for temporarily fixing to the inserting through hole on the board. The present invention can provide a highly reliable bonded assembly, a method of jointing boards therefor and a rivet for facilitating jointing the boards, which assure easy and accurate alignment of the boards, secure an adhesive coating thickness required, prevent the adhesive from adhering to unnecessary portions and increase the strength as the bonded assembly.

3 Claims, 23 Drawing Sheets

1e: CONCAVED PORTION FOR KEEPING ADHESIVE

FOREIGN PATENT DOCUMENTS

| | | |
|---|---|---|
| 44-19732 | 8/1969 | Japan . |
| 49-75969 | 7/1974 | Japan . |
| 58-52395 | 4/1983 | Japan . |
| 59-1806 | 1/1984 | Japan . |
| 61-113503 | 7/1986 | Japan . |
| 61-113504 | 7/1986 | Japan . |
| 63-79244 | 5/1988 | Japan . |
| 2-44110 | 3/1990 | Japan . |
| 3-6107 | 1/1991 | Japan . |
| 91-20297 | 12/1991 | Rep. of Korea . |
| 93-19489 | 10/1993 | Rep. of Korea . |
| 94-27141 | 12/1994 | Rep. of Korea . |
| 610 069 | 3/1979 | Switzerland . |

1a: CONVEXED PORTION
2a: CONCAVED PORTION
3: ADHESIVE

2b: THROUGH HOLE

2c: TAPERED CONCAVED PORTION

1b: CONVEXED PORTION 1d, 2d: THROUGH HOLE
4: RIVET

5a: BOLT
5b: NUT

1e: CONCAVED PORTION
FOR KEEPING ADHESIVE

1f: CONVEXED PORTION
2f: CONCAVED PORTION

2g: THROUGH HOLE

6: ELASTIC MEMBER

4c: THIN WALL PORTION
4d: HOLLOW

4f:SLIT

4g:WEDGED PROJECTION

1h:THROUGH HOLE

PRIOR ART

BONDED ASSEMBLY, METHOD OF JOINTING FOR PREPARATION THEREOF AND RIVET

BACKGROUND OF THE INVENTION

The present invention relates to a bonded assembly characterized by jointing a plurality of boards with adhesives or in combination use of adhesives and fasteners such as screws and rivets, a method of jointing the boards and a rivet, and can be used, for example, for assembling a casing such as a control panel for electrical parts.

FIG. 46 is an exploded perspective view showing a conventional structure for assembling a control panel disclosed, for example, in JU-A-113503/1986. In the figure, the numeral 11 is a roof board, the numeral 12 is a side board, the numeral 13 is a bottom board, the numeral 14 are through holes drilled at the time of board processing for inserting fasteners, and the numeral 5 are jointing surfaces being hatched for making clear. FIGS. 47(a) to (d) show a method of jointing by a fastener bonding. In FIG. 47(a), the numerals 1 and 2 are boards to be bonded. Adhesives are coated on the board 2 for jointing as shown in (b). Then a fastener 9 is inserted in a through hole 14 as shown in (c), and pressed by a fastener riveter not shown in the figure to be deformed as shown by 10 in (d), thus jointing the boards. The above-mentioned works are conducted with the adhesive 3 being in the un-cured state.

The conventional bonded assembly and the method of jointing for preparation thereof are as explained above, and, for example, in the case of a casing as shown in FIG. 46, of which length and depth of the base is about one meter each and the height is not less than two meters, even a small mis-alignment causes the completed casing to be inclined or distorted, and therefore an accurate alignment between the bonding boards is necessary. However, if the adhesives 3 are coated on each board, it results in difficulty in aligning the boards, that is to say, the boards are first placed in the neighborhood of their joint positions and then moved and adjusted to the respective correct positions for alignment. Thus the adhesives stick to unnecessary portions, which results in staining of the boards and requires the excess adhesives to be wiped off or scraped off for finishing up. Also, around the portion jointed with a fastener 10, thickness of a coating layer is very thin, which causes various problems such as lowering of adhesive strength and lowering of water tightness due to occurrence of portions lacking in adhesives, thus making it impossible to obtain a highly reliable bonded assembly.

The present invention was made to solve the above-mentioned problems. The objects of the present invention are to provide a highly reliable bonded assembly, a method of jointing therefor and rivets facilitating jointing of boards, which assure an easy and accurate alignment of the boards to be jointed, secure an adhesive coating thickness required, prevent the adhesives from adhering to the unnecessary portions and enhance the strength as the bonded assembly.

SUMMARY OF THE INVENTION

The first invention relates to an adhesive-bonded assembly of a board having a convexed portion on a jointing surface thereof and a board having, on a jointing surface thereof, a concaved portion or through hole to be engaged with the convexed portion.

The second invention relates to a bonded assembly, in which in jointing a plurality of boards with adhesives, at least one of the boards is provided with a convexed portion on a jointing surface thereof.

The third invention relates to a bonded assembly, in which in jointing a plurality of boards with adhesives, at least one of the boards is provided with a through hole on an adhesive coating surface thereon.

The fourth invention relates to a bonded assembly, in which in any of the first to the third inventions, a plurality of boards are jointed with adhesive or in combination use of adhesives and fasteners such as rivets and screws.

Further the fifth invention relates to a method of jointing for preparation of a bonded assembly, in which in jointing, with adhesives, a board having a convexed portion on a jointing surface thereof and a board having, on a jointing surface thereof, a concaved portion or through hole to be engaged with the convexed portion, the adhesives are coated on the portion other than the convexed portion of the board so that the coating thickness is smaller than the height of the convexed portion, and then the boards are jointed after making alignment.

Further the sixth invention relates to rivets having means for fitting to and temporarily fixing to an inserting through hole.

Further the seventh invention relates to a method of jointing for preparation of a bonded assembly, comprising the step for inserting, fitting and fixing, into a rivet inserting through hole on one board, a rivet having means for fitting to and temporary fixing to the through hole, the step for coating adhesive on the bonding surface of the board with the rivet temporarily fixed thereto or another board having a rivet inserting through hole, the step for inserting the rivet fixed to one board into the through hole on another board and the step for fastening the rivet.

Further the eighth invention relates to a bonded assembly, in which as an adhesive, a modified acrylic adhesive is used.

BRIEF DESCRIPTION OF THE DRAWINGS

FIG. 39(a) is a longitudinal sectional view and FIG. 39(b) is a sectional view A—A of FIG. 39(a).

DETAILED DESCRIPTION

Figure 1:
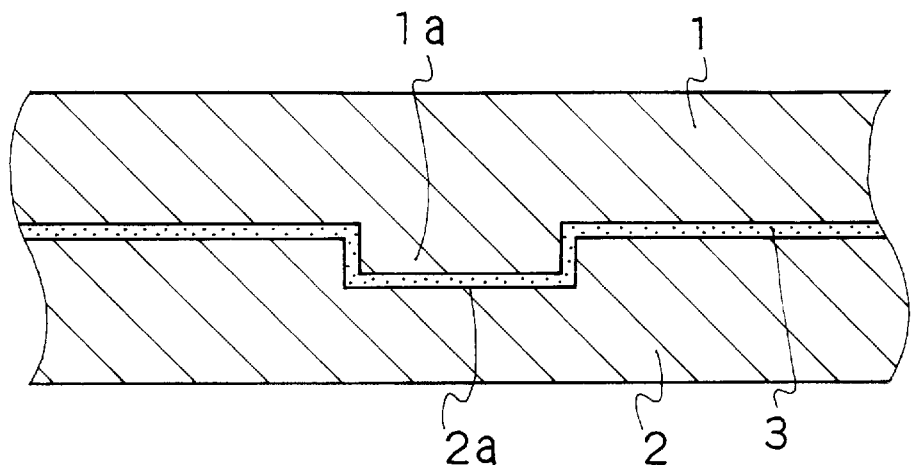
FIG. 1 is a sectional view showing an essential part of a bonded assembly of the 1st Example of the present invention.

The bonded assembly of the 1st invention assures an easy alignment by engaging the convexed portion on the jointing surface of the board with the concaved portion or through hole on the jointing surface of another board.

According to the 1st invention, the convexed portion, concaved portion or through hole is shaped tapered. It is preferable that the convexed portion rests on the concaved portion or through hole at the tapered part, thereby enabling all the more accurate alignment.

According to the 1st invention, it is preferable to make the height of the convexed portion larger than the depth of the concaved portion, thus securing the adhesives coating thickness required and enhancing a reliability on adhesivity.

According to the 1st invention, the height of the convexed portion is made smaller than the depth of the concaved portion, which assures the adhesives coating thickness required at the engaged portion and enhances a reliability on adhesivity.

According to the 1st invention, it is preferable to make the top of the convexed portion being concave for maintaining adhesives therein, thus enabling the adhesives to be maintained at the engaged portion and enhancing a reliability on adhesivity.

According to the 1st invention, it is preferable that the convexed portion is in the form of a cylinder and the concaved portion or through hole is in the form of a polygonal prism, thus making it easy for the adhesives to flow into a gap between the circle and the polygon at the engaged portion and enhancing a reliability on adhesivity.

According to the 1st invention, it is preferable that the convexed portion is in the polygonal or elliptic form similar to the concaved portion or through hole, which prevents the boards from turning at the engaged portion.

According to the 1st invention, it is preferable that at least one of the boards is a sheet and the sheet itself is transformed in the thickness direction thereof to provide the same form of the convexed and concaved portions on the sheet. Thus the convexed and concaved portions can be molded by a press, and processing of the sheet is easy.

The bonded assembly of the 2nd invention assures the adhesive coating thickness required and enhances a reliability on adhesivity since in jointing a plurality of boards, at least one of the boards is provided with a convexed portion on a jointing surface.

The bonded assembly of the 3rd invention makes it easy to see where to coat the adhesives and check the coated condition of the adhesives by seeing whether or not the adhesives are flowing out of the through hole after the boards are jointed because at least one of a plurality of boards is provided with the through hole on the bonding surface thereof.

The bonded assembly of the 4th invention is one jointed with a plurality of boards in combination use of the adhesives and fasteners in any of the above-mentioned 1st to 3rd inventions, which makes it possible to assure the temporary fixing until the adhesives are cured and to enhance the strength as the bonded assembly.

According to the 4th invention, the boards can be jointed easily by the use of rivets or screws as fasteners.

According to the 4th invention, wherein at least one of the boards is a sheet, which is transformed in the thickness direction thereof to provide the same form of convexed and concaved portions on both sides of the sheet, the convexed portion formed on the sheet is engaged with the concaved portion of another board, and the boards are jointed with the fastener inserted in the through holes on the engaged portion of both the sheet and the board, it is preferable that the depth of the concaved portion formed on the back of the convexed portion of the sheet is larger than the height of the protruding portion of the fastener, thus causing the fastener not to protrude over the surface on the back of the jointing surface of the sheet.

The method for jointing for preparation of the bonded assembly of the 5th invention, wherein in jointing, with adhesives, the board having the convexed portion on the jointing surface thereof and the board having, on the jointing surface thereof, the concaved portion or through hole, the adhesives are coated on the portion other than the convexed portion of the board so that the adhesive coating thickness is smaller than the height of the convexed portion and then the boards are jointed after making alignment, thus making it possible to prevent the adhesives from adhering to unnecessary portions at the time of jointing.

The rivet of the 6th invention has means for fitting and temporarily fixing to the inserting through hole, which prevents the rivet from dropping during a time period from inserting into the through hole up to fastening and makes bonding works easy.

According to the 6th invention, means for temporarily fixing to the inserting through hole is an elastic member or a projection provided on the fitting portion of the rivet for easy formation of the fixing means.

According to the 6th invention, means for temporarily fixing to the inserting through hole is a thin wall portion of the rivet, which is pressed to expand in the direction of its diameter, thus surely fixing the rivet temporarily to the inserting through hole.

The method of jointing for preparation of the bonded assembly of the 7th invention comprises the step for inserting, fitting and fixing the rivet of the 6th invention to the rivet inserting through hole of one board, the step for coating adhesives on the bonding surface of the board with the rivet temporarily fixed thereto or another board having the rivet inserting through hole, the step for inserting the rivet inserted and fixed to the board, into the rivet inserting through hole of another board and the step for fastening the rivet. This method, as compared with the method to insert and fasten the rivet after coating of adhesives, assures easier alignment and jointing works because the rivet does not drop even if inserted from below.

As the adhesive of the eighth invention to be used for the bonded assembly of the present invention, the modified acrylic adhesive is preferable, and epoxy type and urethane type adhesives can be also used.

The present inventions are explained concretely according to Examples and Drawings, but are not limited thereto.

PREFERRED EMBODIMENTS OF THE INVENTION

FIG. 1 is a sectional view showing an essential part of the bonded assembly of the 1st Example of the present invention. In FIG. 1, 1a is a convexed portion formed on the jointing surface of the board 1, and 2a is a concaved portion formed on the jointing surface of the board 2 and to be engaged with the convexed portion 1a.

The convexed portion 1a is in the form of ridges or islands, and the concaved portion 2a is in the form of grooves or ponds, corresponding to the shape of the convexed portion 1a. This applies in the following Examples unless otherwise explained.

As materials for the boards 1 and 2, there can be used metal, plastic and the like. As adhesive 3, modified acrylic adhesives, epoxy adhesives, urethane adhesives or the like can be used. This applies in the following Examples, too.

Figure 2:
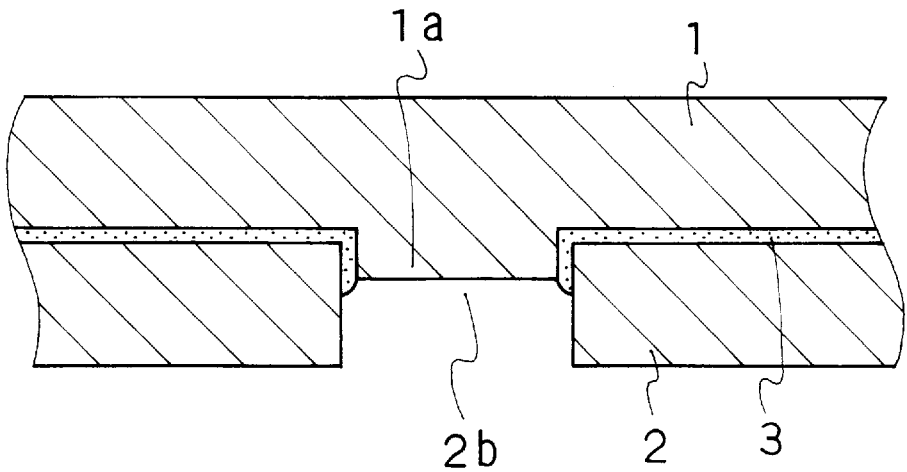
FIG. 2 is a sectional view showing an essential part of a bonded assembly of the 2nd Example of the present invention.

FIG. 2 is a sectional view showing an essential part of the bonded assembly of the 2nd Example of the present invention. In FIG. 2, 2b is a through hole drilled on the jointing surface of the board 2 and is to be engaged with the convexed portion 1a.

The through hole 2b is fabricated rather easily as compared with the concaved portion 2a of Example 1.

Figure 3:
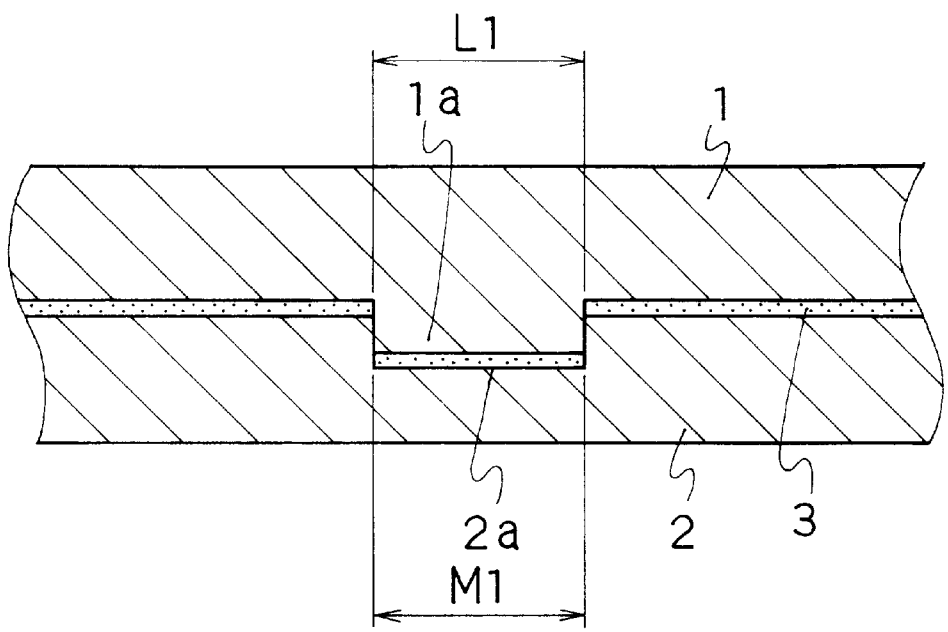
FIG. 3 is a sectional view showing an essential part of a bonded assembly of the 3rd Example of the present invention.

FIG. 3 is a sectional view showing an essential part of the bonded assembly of the 3rd Example of the present invention. In this Example, for increasing accuracy of alignment, the size (L1) of the convexed portion 1a is nearly the same as that (M1) of the concaved portion 2a to fit the convexed portion 2a.

Figure 4:
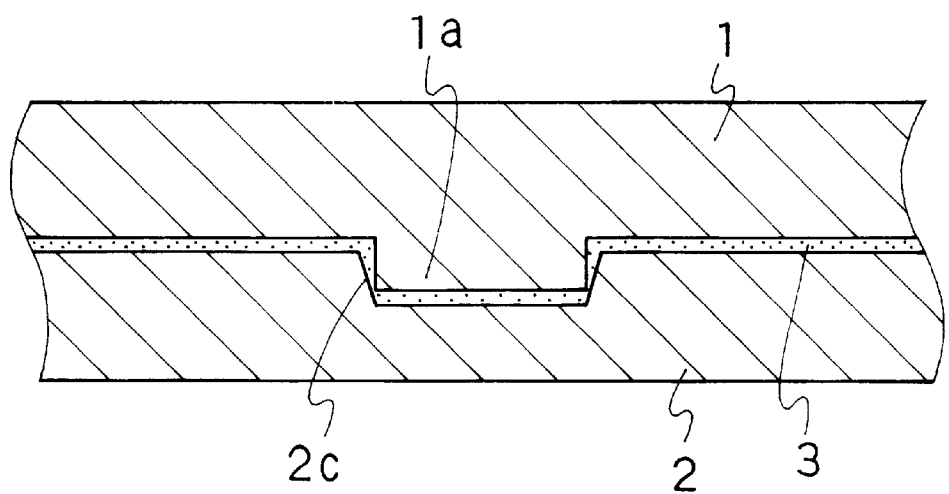
FIG. 4 is a sectional view showing an essential part of a bonded assembly of the 4th Example of the present invention.

FIG. 4 is a sectional view showing an essential part of the bonded assembly of the 4th Example of the present invention. In FIG. 4, 2c is a concaved portion tapered for increasing accuracy of alignment, and the convexed portion 1a rests on the tapered portion.

This Example shows the case where the concaved portion is tapered, but the convexed portion may be tapered or both of the convexed and concaved portions may be tapered. Further the through hole may be tapered.

Figure 5:
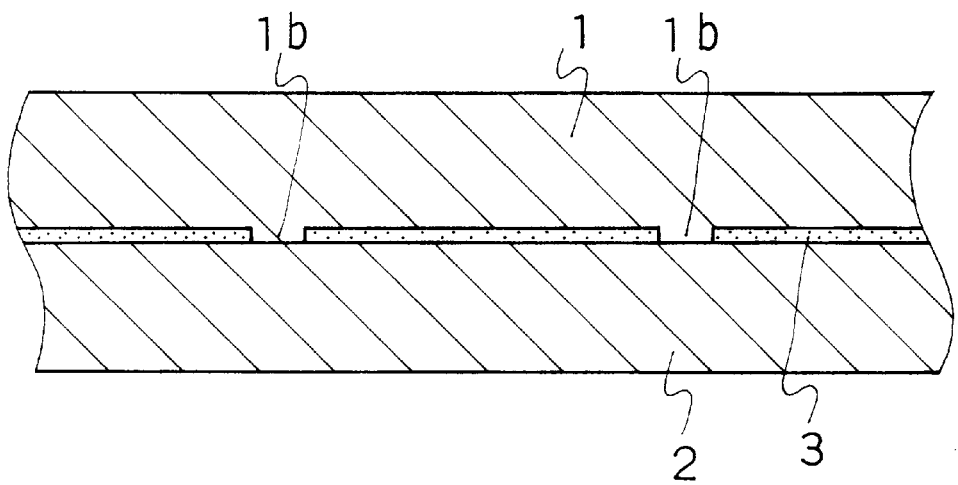
FIG. 5 is a sectional view showing an essential part of a bonded assembly of the 5th Example of the present invention.

FIG. 5 is a sectional view showing an essential part of the bonded assembly of the 5th Example of the present invention. In FIG. 5, 1b is a convexed portion provided on the jointing surface of the board 1 for securing the thickness of an adhesive layer. The desired adhesive layer thickness can be obtained by adjusting the height of the convexed portion 1b.

Figure 6:
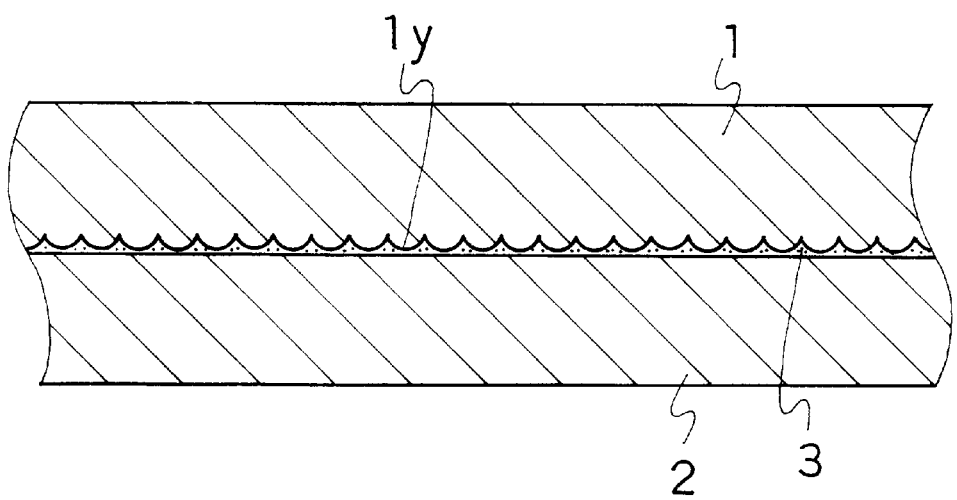
FIG. 6 is a sectional view showing an essential part of a bonded assembly of the 6th Example of the present invention.

FIG. 6 is a sectional view showing an essential part of the bonded assembly of the 6th Example of the present invention. This Example shows another example of the convexed portion 1b of Example 5, where projections 1y are provided. The projections 1y can be easily formed by sand blast, liquid honing, electric discharge, grinding, drawing, extrusion, knurling, etching, pickling, molding and the like.

Figure 7:
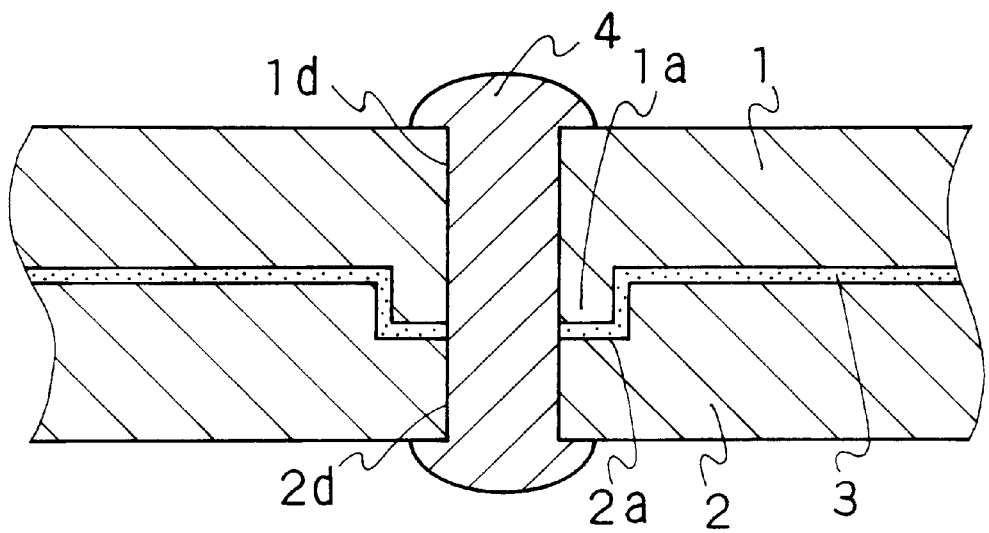
FIG. 7 is a sectional view showing an essential part of a bonded assembly of the 7th Example of the present invention.

FIG. 7 is a sectional view showing an essential part of the bonded assembly of the 7th Example of the present invention. In FIG. 7, the numeral 4 is a rivet, and 1d and 2d are the rivent inserting through holes drilled on the convexed portion 1a and concaved portion 2a of the board 1 and 2 respectively. The combination use of the adhesive 3 and the fastener (rivet 4 in this Example) can assure the temporary fixing until the adhesive 3 is cured and enhance the strength as the bonded assembly.

Figure 8:
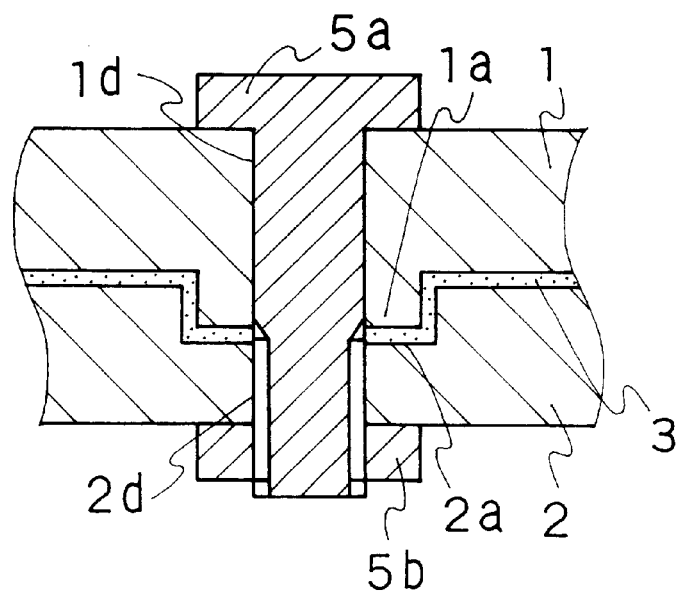
FIG. 8 is a sectional view showing an essential part of a bonded assembly of the 8th Example of the present invention.

FIG. 8 is a sectional view showing an essential part of the bonded assembly of the 8th Example of the present invention, and the bolt 5a and nut 5b are used as a fastener instead of the rivet 4 in FIG. 7. The same effect as in the 7th Example can be obtained in this 8th Example.

Figure 9:
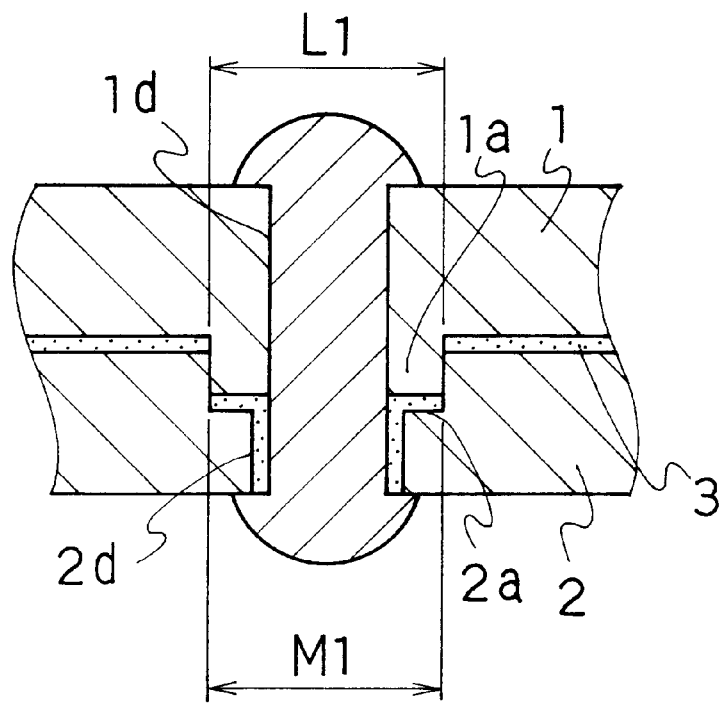
FIG. 9 is a sectional view showing an essential part of a bonded assembly of the 9th Example of the present invention.

FIG. 9 is a sectional view showing an essential part of the bonded assembly of the 9th Example of the present invention. In this Example, in order to increase accuracy of alignment, the sizes (L1) and (M1) of the convexed portion 1a and the concaved portion 2a respectively are made nearly the same in the same manner as in FIG. 3 so that the convexed portion 1a is fitted to the concaved portion 2a, and the rivet 4 is also used, thus assuring the temporary fixing of the boards until the adhesive 3 is cured, and also enhancing the strength as the bonded assembly.

Figure 10:
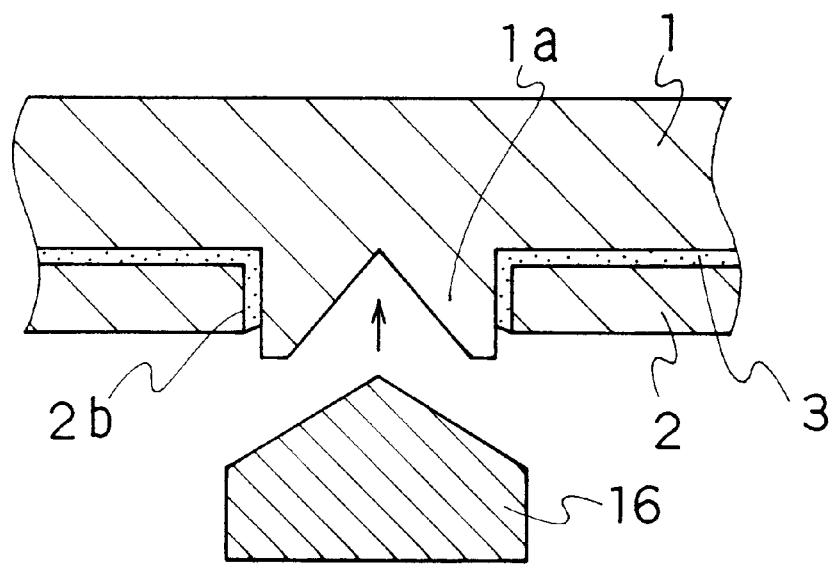
FIG. 10 is a sectional view showing an essential part of a bonded assembly of the 10th Example of the present invention.
Figure 11:
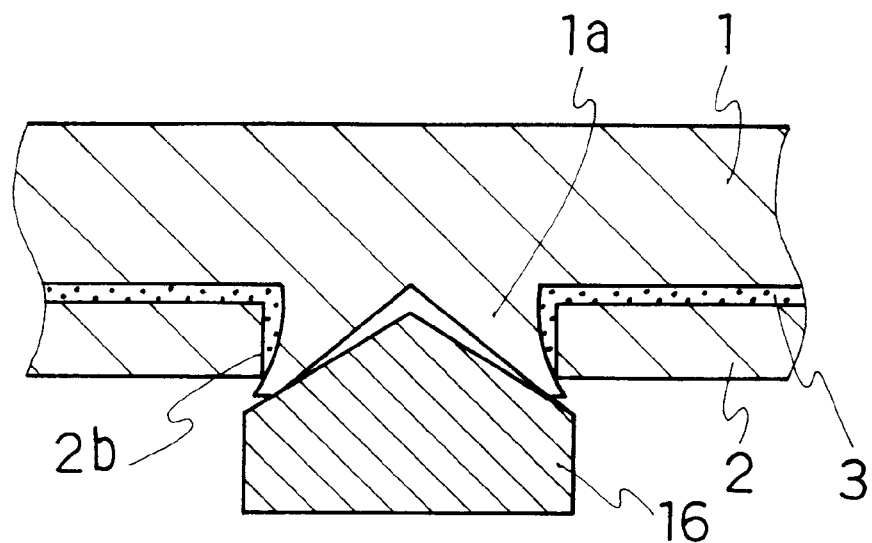
FIG. 11 is a sectional view showing an essential part of a bonded assembly of the 10th Example of the present invention.

FIG. 10 and 11 are sectional views showing essential parts of the bonded assembly with regard to the 10th Example of the present invention, and mainly show examples of the deformation of fasteners. As shown in FIG. 10, the convexed portion 1a is larger than the depth of the through hole 2b, and the concaved portion is formed at the top of the convexed portion 1a. The fastener is punched by a punch 16 and expands outward as shown in FIG. 11, thereby fastening the boards 1 and 2.

Figure 12:
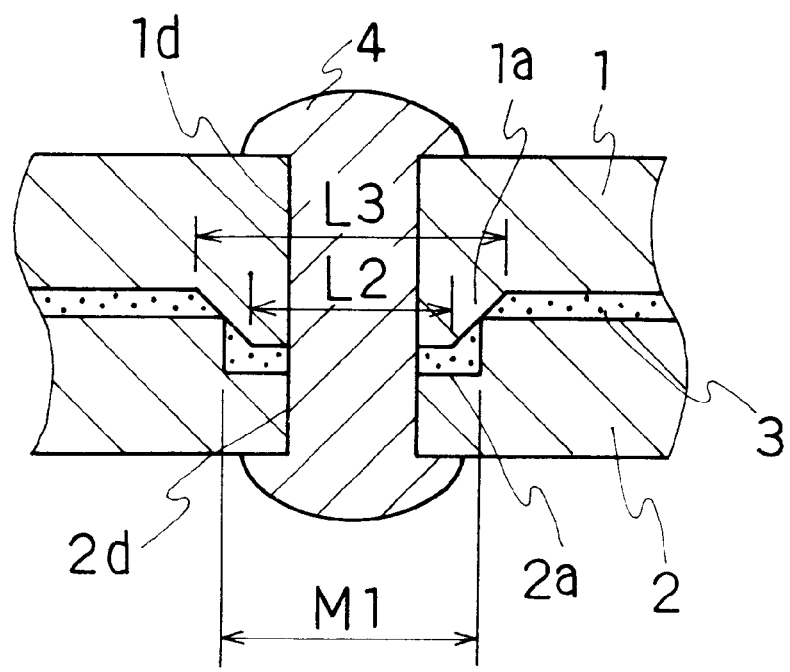
FIG. 12 is a sectional view showing an essential part of a bonded assembly of the 11th Example of the present invention.

FIG. 12 is a sectional view showing an essential part of the bonded assembly of the 11th Example of the present invention. In this Example, the convexed portion is tapered to assure an accurate alignment and ensure the adhesive layer thickness required. The size (L3) at the bottom of the taper is larger than the size (M1) of the concaved portion, and the size (L2) at the top of the taper is smaller than (M1), thus making the convexed portion 1a to rest on the concaved portion 2a at the tapered portion.

Figure 13:
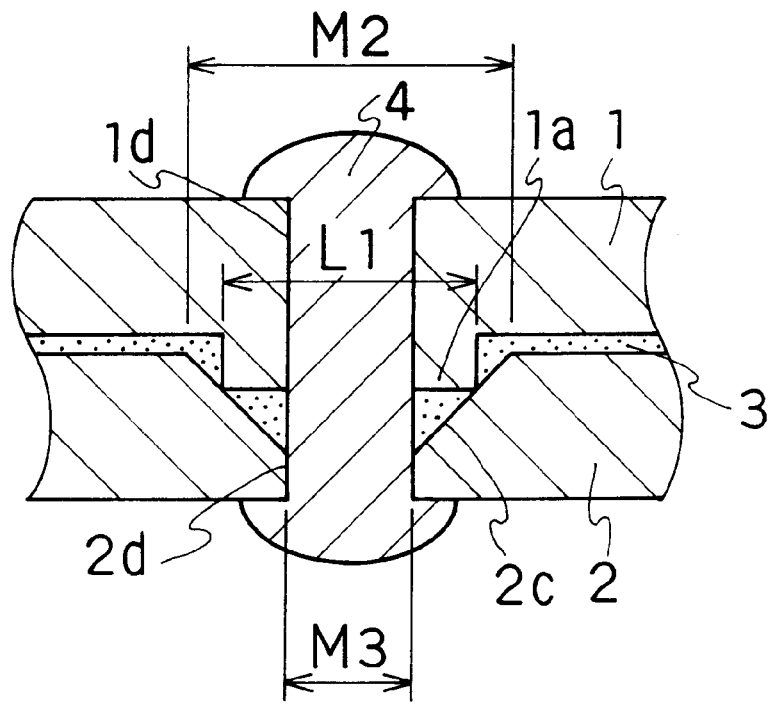
FIG. 13 is a sectional view showing an essential part of a bonded assembly of the 12th Example of the present invention.

FIG. 13 is a sectional view showing an essential part of the bonded assembly of the 12th Example of the present invention. In this Example, the concaved portion is tapered for assuring an accurate alignment of the boards and securing the adhesive layer thickness required. The size (M2) at the top of the tapered portion 2c is larger than the size (L1) of the convexed portion, and the size (M3) at the bottom of the tapered portion 2c is the same as a diameter of the rivet, thereby making the convexed portion 1a to rest on the concaved portion at the tapered part.

Figure 14:
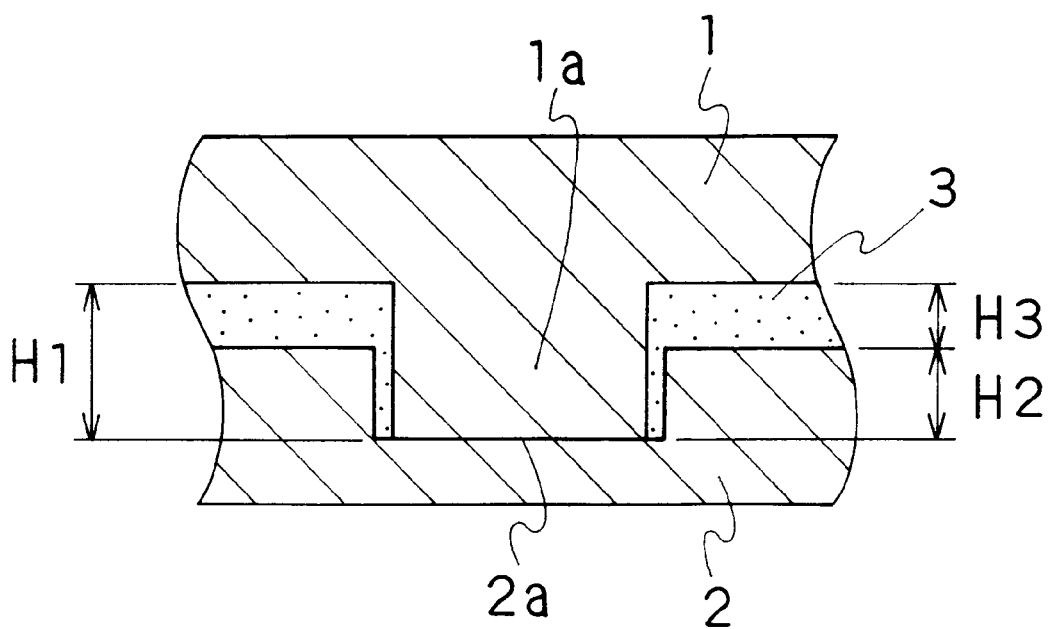
FIG. 14 is a sectional view showing an essential part of a bonded assembly of the 13th Example of the present invention.

FIG. 14 is a sectional view showing an essential part of the bonded assembly of the 13th Example of the present invention. In this Example, for securing the adhesive layer thickness (H3), the height (H1) of the convexed portion 1a is larger than the depth (H2) of the concaved portion by the adhesive layer thickness (H3).

Figure 15:
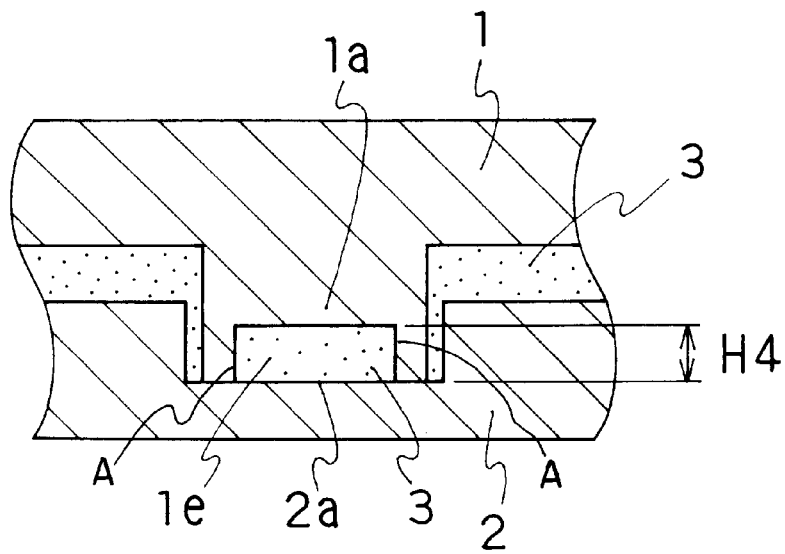
FIG. 15 is a sectional view showing an essential part of a bonded assembly of the 14th Example of the present invention.

FIG. 15 is a sectional view showing an essential part of the bonded assembly of the 14th Example of the present invention. In this Example, the concaved portion 1e has a bank a for keeping the adhesives therein and is formed at the top of the convexed portion 1a of the board 1 shown in FIG. 14 to secure the adhesive layer thickness (H4).

Figure 16:
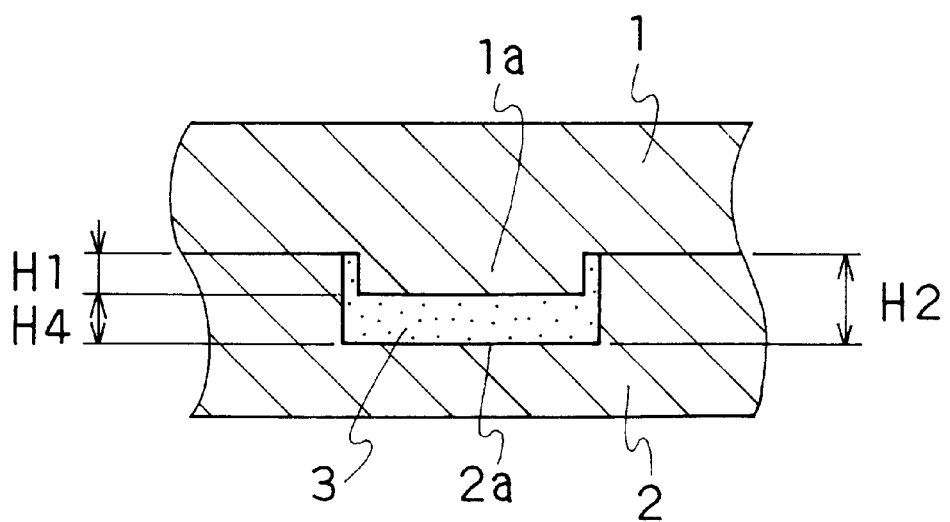
FIG. 16 is a sectional view showing an essential part of a bonded assembly of the 15th Example of the present invention.

FIG. 16 is a sectional view showing an essential part of the bonded assembly of the 15th Example of the present invention. In this Example, the height (H1) of the convexed portion 1a is smaller than the depth (H2) of the concaved portion 2a by the adhesive layer thickness (H4) to secure the thickness (H4) of the adhesive layer in the engaged portion.

Figure 17:
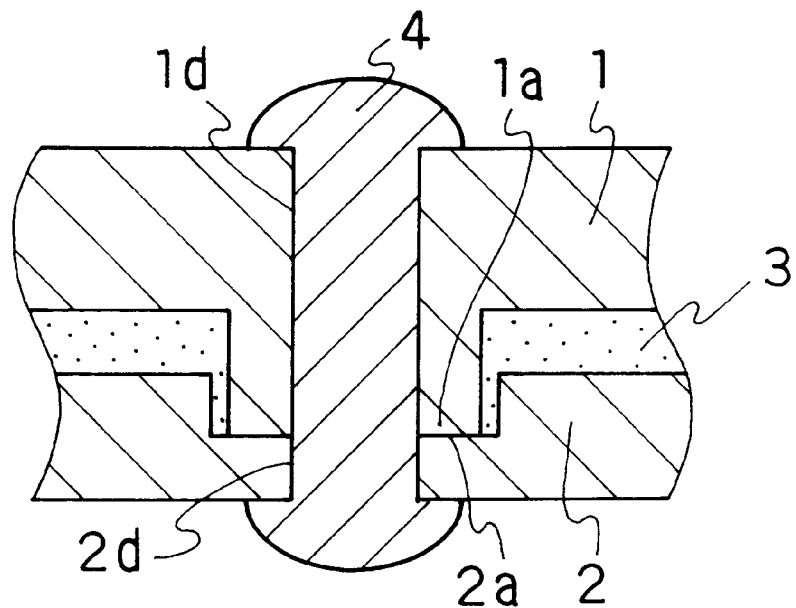
FIG. 17 is a sectional view showing an essential part of a bonded assembly of the 16th Example of the present invention.

FIG. 17 is a sectional view showing an essential part of the bonded assembly of the 16th Example of the present invention. In this Example, through holes 1d and 2d for fastening the rivet 4 are provided in the convexed portion 1a formed on the jointing surface of the board 1 and in the concaved portion formed on the jointing surface of the board 2 respectively of the bonded assembly shown in FIG. 14, and the rivet 4 is fastened in order to assure the temporary fixing of the boards until the adhesive is cured and enhance the strength and reliability as the bonded assembly.

Figure 18:
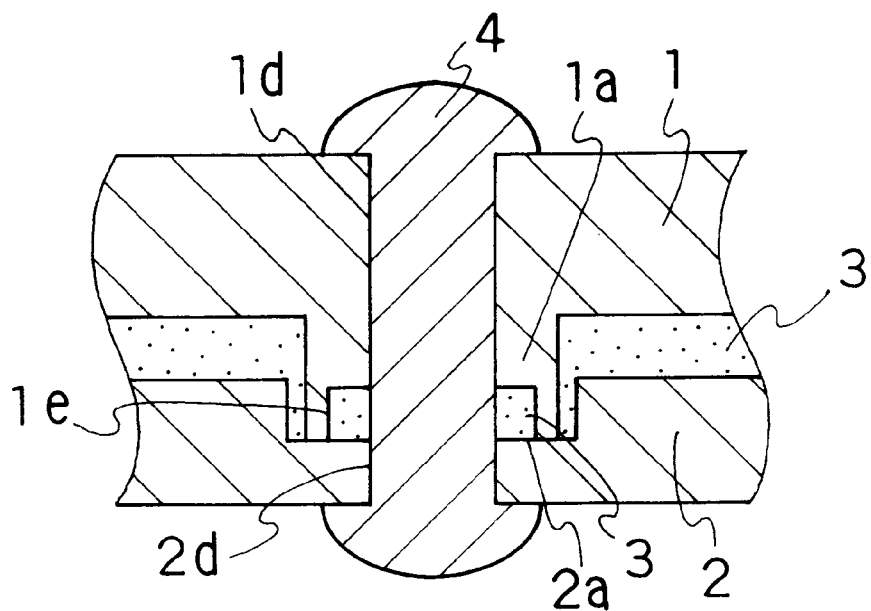
FIG. 18 is a sectional view showing an essential part of a bonded assembly of the 17th Example of the present invention.

FIG. 18 is a sectional view showing an essential part of the bonded assembly of the 17th Example of the present invention. In this Example, through holes 1d and 2d for fastening the rivet 4 are provided in the convexed portion 1a formed on the jointing surface of the board 1 and in the concaved portion formed on the jointing surface of the board 2 respectively of the bonded assembly shown in FIG. 15, and the rivet 4 is fastened in order to assure the temporary fixing of the boards until the adhesive is cured and enhance the strength and reliability as the bonded assembly.

Figure 19:
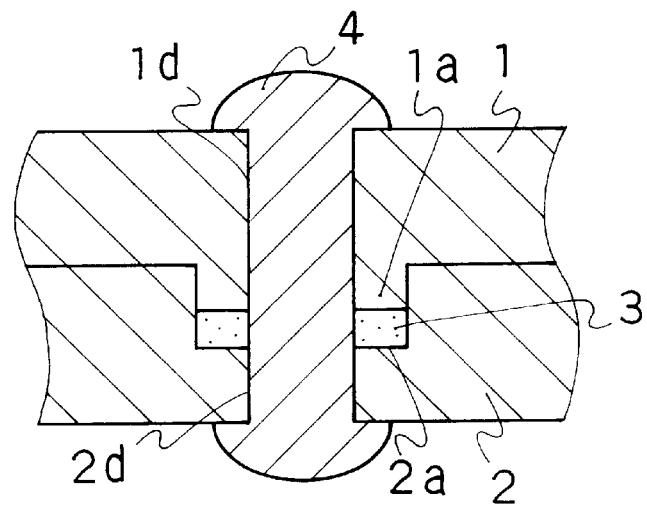
FIG. 19 is a sectional view showing an essential part of a bonded assembly of the 18th Example of the present invention.

FIG. 19 is a sectional view showing an essential part of the bonded assembly of the 18th Example of the present invention. In this Example, the through holes 1d and 2d are provided in the convexed portion 1a and concaved portion 2a on the jointing surfaces of the boards 1 and 2 respectively of the bonded assembly shown in FIG. 16, and the boards are jointed with the rivet 4 in order to assure the temporary fixing of the boards until the adhesive is cured and enhance the strength and reliability as the bonded assembly. Also the size of the convexed portion 1a is nearly the same as that of the concaved portion 2a for enhancing an accuracy of alignment in fitting the convexed portion 1a to the concaved portion 2a.

Figure 20:
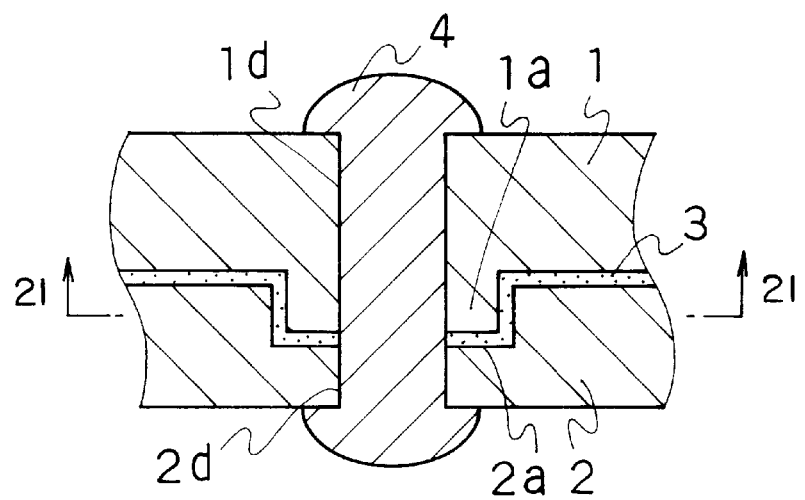
FIG. 20 is a sectional view showing an essential part of a bonded assembly of the 19th Example of the present invention.
Figure 21:
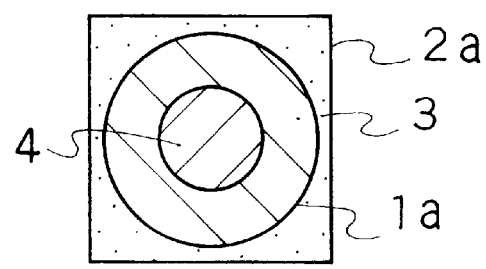
FIG. 21 relates to the 19th Example of the present invention and shows a section A—A of FIG. 20.
Figure 22:
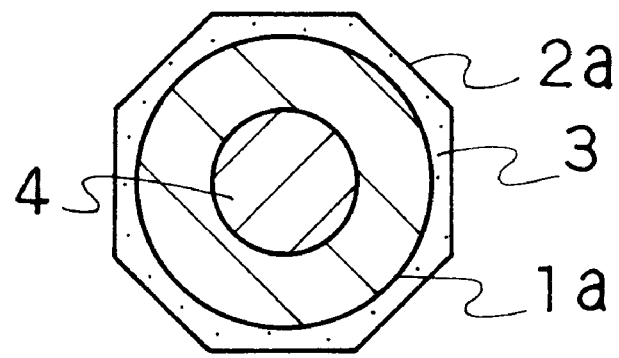
FIG. 22 relates to the 19th Example of the present invention and shows a section A—A of FIG. 20.

FIG. 20 is a sectional view showing an essential part of the bonded assembly of the 19th Example of the present invention, and FIGS. 21 and 22 are a cross-section A—A of FIG. 20. In this Example, a section of the convexed portion 1a is a circle as shown in FIG. 21 and 22, i.e., the convexed portion is in the form of a cylinder, and a section of the concaved portion 2a is a polygon such as a square or an octagon, i.e., the concaved portion 2a is a polygonal prism, thus making it easy for the adhesive 3 to flow into the concaved portion 2a through a gap between the circle and the polygon at the time of jointing the boards 1 and 2.

This Example shows the case where the shapes of the convexed portion 1a and concaved portion 2a of the bonded assembly shown in FIG. 7 are specific variations, but the present invention is not limited thereto. These variations in shapes can be applied to the convexed portion 1a and concaved portion 2a of the bonded assembly as shown in FIGS. 1, 3, 4, 8, 9 and 12 to 19.

Figure 23:
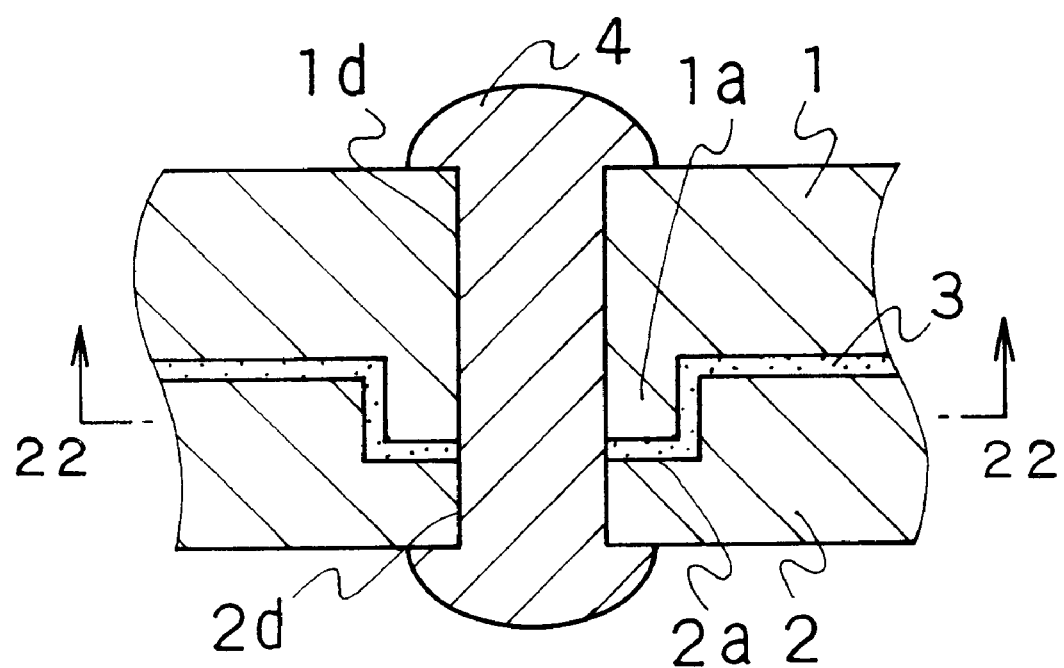
FIG. 23 is a sectional view showing an essential part of a bonded assembly of the 20th Example of the present invention.
Figure 24:
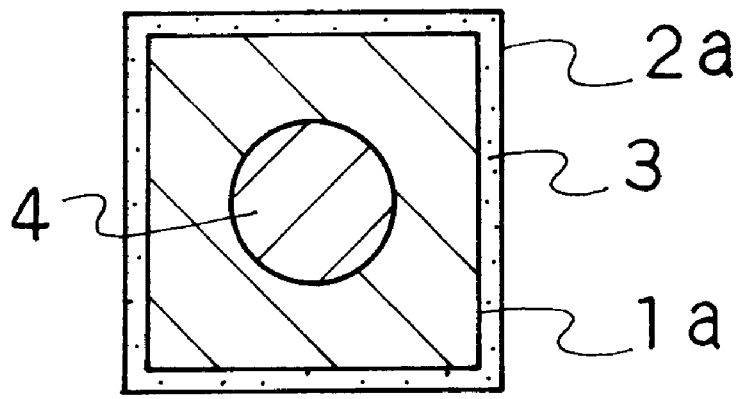
FIG. 24 relates to the 20th Example of the present invention and shows a section A—A of FIG. 23.
Figure 25:
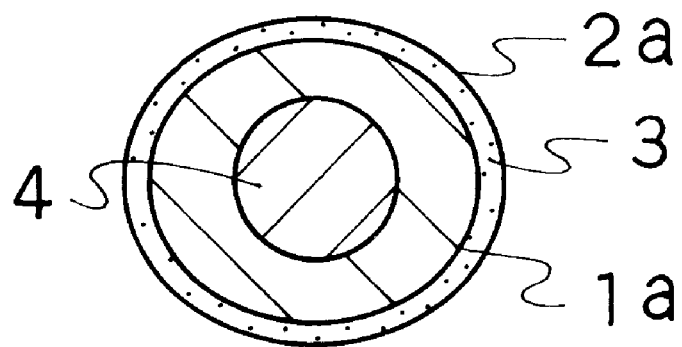
FIG. 25 relates to the 20th Example of the present invention and shows a section A—A of FIG. 23.

FIG. 23 is a sectional view showing an essential part of the bonded assembly of the 20th Example of the present invention. FIGS. 24 and 25 are a cross-section A—A of FIG. 23. The sections of the convexed portions 1a and 2a are in the form of a polygon such as a rectangle, an ellipse and the like similar to each other, which prevents the boards from turning at the engaged portion.

Though these examples show the case where the shapes of the convexed portion 1a and concaved portion 2a of the bonded assembly shown in FIG. 7 are specific variations, the present invention is not limited thereto, but these variations in shapes can also be applied to the convexed portion 1a and concaved portion 2a of the bonded assembly as shown in FIGS. 1, 3, 4, 8, 9 and 12 to 19, and also to the engagement of the convexed portion 1a with the through hole 2b as shown in FIG. 2.

Figure 26:
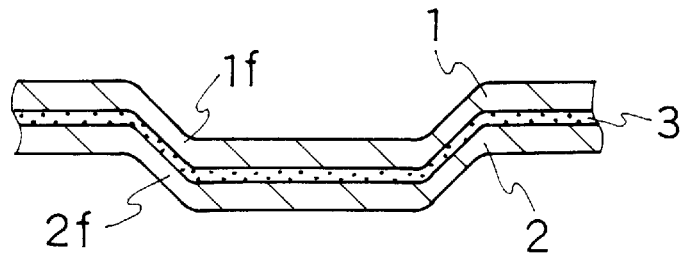
FIG. 26 is a sectional view showing an essential part of a bonded assembly of the 21st Example of the present invention.

FIG. 26 is a sectional view showing an essential part of the bonded assembly of the 21st Example of the present invention. In this Example, the both numerals 1 and 2 to be bonded are the sheets. The convexed portion 1f is formed on the bonding surface of the sheet 1 by means of a press, and the concaved portion 2f is formed on the mating surface of the sheet 2 by means of a press so that the concaved portion 2f is engaged with the convexed portion 1f. An easy and accurate alignment can be made by resting the convexed portion If on the concaved portion 2f. The convexed portion 1f and concaved portion 2f can be easily formed with a press.

On the backs of the convexed portion 1f and concaved portions 2f are formed the concaved and convexed portions respectively. That is to say, each sheet itself is transformed so that the same form of the convexed and concaved portions are provided on the same sheet.

Figure 27:
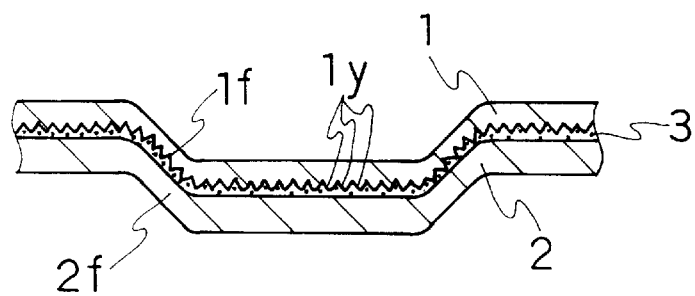
FIG. 27 is a sectional view showing an essential part of a bonded assembly of the 22nd Example of the present invention.
Figure 28:
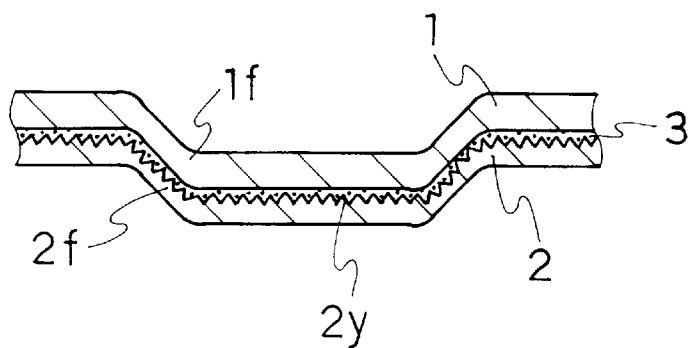
FIG. 28 is a sectional view showing an essential part of a bonded assembly of the 22nd Example of the present invention.
Figure 29:
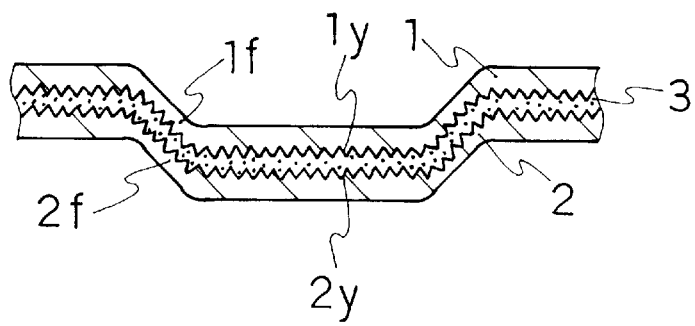
FIG. 29 is a sectional view showing an essential part of a bonded assembly of the 22nd Example of the present invention.

FIGS. 27 to 29 are sectional views showing essential parts of the bonded assembly of the 22nd Example of the present invention. This Example shows the case where a plurality of projections are formed on at least one of the bonding surfaces of the boards of the bonded assembly shown in FIG. 26, in order to secure the thickness of the adhesive layer. In FIG. 27, the projections 1y are formed on the sheet 1, in FIG. 28, the projections 2y, on the sheet 2, and in FIG. 29, the projections 1y and 2y, on both sheets 1 and 2.

The projections 1y and 2y can be formed by sand blasting, liquid honing, electric discharge, grinding, drawing, extrusion, knurling, etching, pickling, molding and the like.

Figure 30:
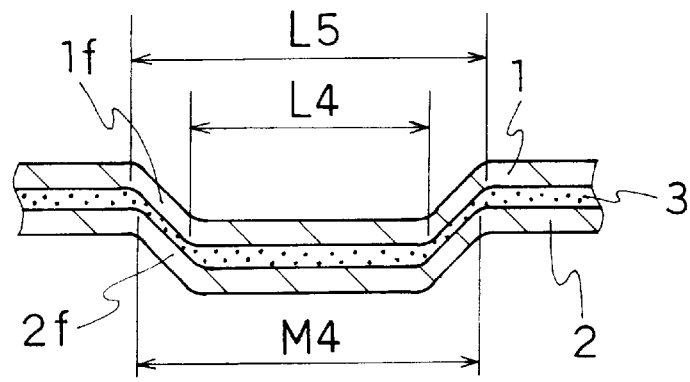
FIG. 30 is a sectional view showing an essential part of a bonded assembly of the 23rd Example of the present invention.

FIG. 30 is a sectional view showing an essential part of the bonded assembly of the 23rd Example of the present invention. In this Example, in order to secure the thickness of the adhesive layer of the bonded assembly shown in FIG. 26, both the convexed portion 1f and the concaved portion 2f are tapered, and the maximum size (M4) of the concaved portion 2f is smaller than the maximum size (L5) of the convexed portion but larger than the minimum size (L4) of the convexed portion, thus making the concaved portion 2f to rest in the middle of the tapered portion of the convexed portion 1f to enable more accurate alignment and secure the adhesive layer in either of the engaged portion between the convexed and concaved portions and the other portions.

The above-mentioned Examples 21 to 23 explain the case where the both boards 1 and 2 to be bonded are the sheets, but at least one of them may be the sheet.

Figure 31:
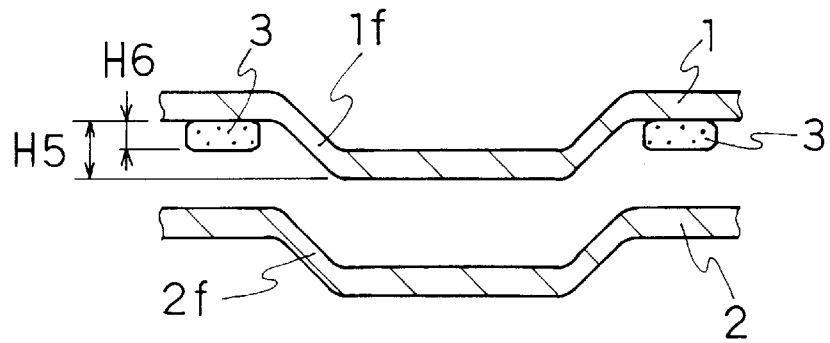
FIG. 31 is a sectional view explaining a method of jointing for preparation of a bonded assembly of the 24th Example of the present invention.
Figure 32:
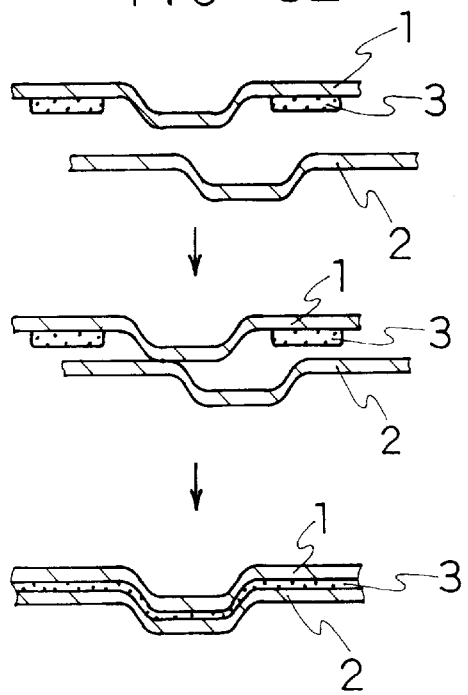
FIG. 32 is a sectional view explaining a method of jointing for preparation of a bonded assembly of the 24th Example of the present invention.

FIGS. 31 and 32 are sectional views explaining a method of jointing for preparation of the bonded assembly of the 24th Example of the present invention. In this Example, the adhesive 3 is coated on the bonding surfaces other than the convexed portion 1f of the sheet 1 so that the coated thickness (H6) is smaller than the height (H5) of the convexed portion 1f, and then the sheet 1 is bonded with the sheet having the concaved portion 2f after alignment. Thus until the sheets 1 and 2 are engaged and bonded, the coated adhesive 3 does not adhere to the mating surface of another sheet 2, which can prevent the adhesive 3 from adhering to unnecessary portions and staining the sheet 2.

This Example explains the case where the sheets 1 and 2 are bonded, but the present invention is not limited thereto. The sheet may be bonded to the plate, or the both may be the plates. Also, the through hole may take place of the concaved portion.

Figure 33:
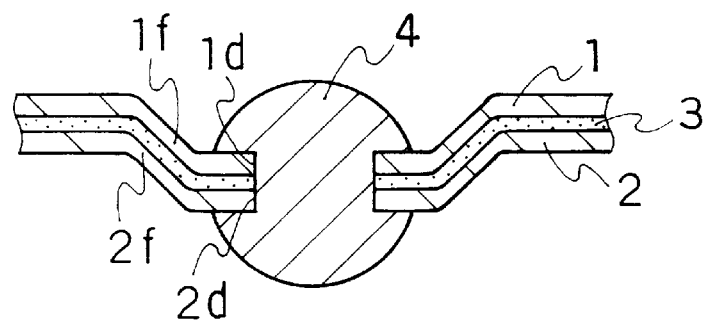
FIG. 33 is a sectional view explaining a method of jointing for preparation of a bonded assembly of the 25th Example of the present invention.

FIG. 33 is a sectional view showing an essential part of the bonded assembly of the 25th Example of the present invention. This Example shows the use of the rivet 4 in combination of adhesives at an engaging portion for jointing of the bonded assembly of FIG. 26, which assures the temporary fixing of the boards until the adhesives are cured and enhances the strength as the bonded assembly.

Figure 34:
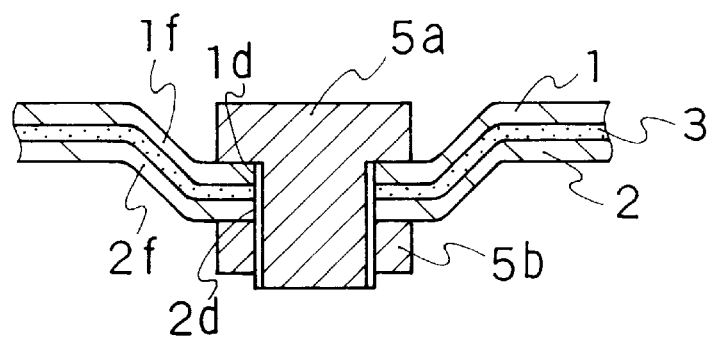
FIG. 34 is a sectional view explaining a method of jointing for preparation of a bonded assembly of the 26th Example of the present invention.

FIG. 34 is a sectional view showing an essential part of the bonded assembly of the 26th Example of the present invention, and the bolt 5a and nut 5b are used instead of the rivet 4 of FIG. 33.

The 25th and 26th Examples explain the case where the fasteners are used on the engaging portion of the bonded assembly shown in FIG. 26. The fasteners may be used on the other bonded assemblies as shown in FIG. 27 to 30.

Figure 35:
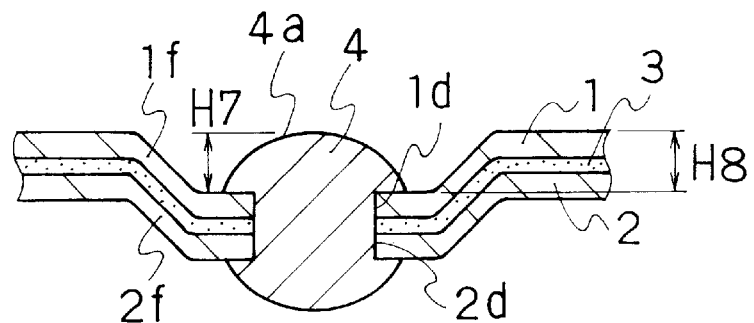
FIG. 35 is a sectional view explaining a method of jointing for preparation of a bonded assembly of the 27th Example of the present invention.

FIG. 35 is a sectional view showing an essential part of the bonded assembly of the 27th Example of the present invention. In the bonded assembly using the fasteners on the engaging portion as shown in FIG. 33, in order to prevent the fasteners from protruding over the back surface of the sheet, the depth (H8) of the concaved portion formed on the back of the convexed portion If of the sheet 1 is larger than the height of the protruding portion of the fastener, or the height (H7) of the head 4a of the rivet 4 of this Example.

This Example shows a relation of the height (H7) of the protruding portion of the fastener with the depth (H8) of the concaved portion in the bonded assembly as shown in FIG. 33. This relation can be applied in the case where the fasteners are used in combination of the adhesives on the bonded assemblies as shown in FIGS. 27 to 30.

Figure 36:
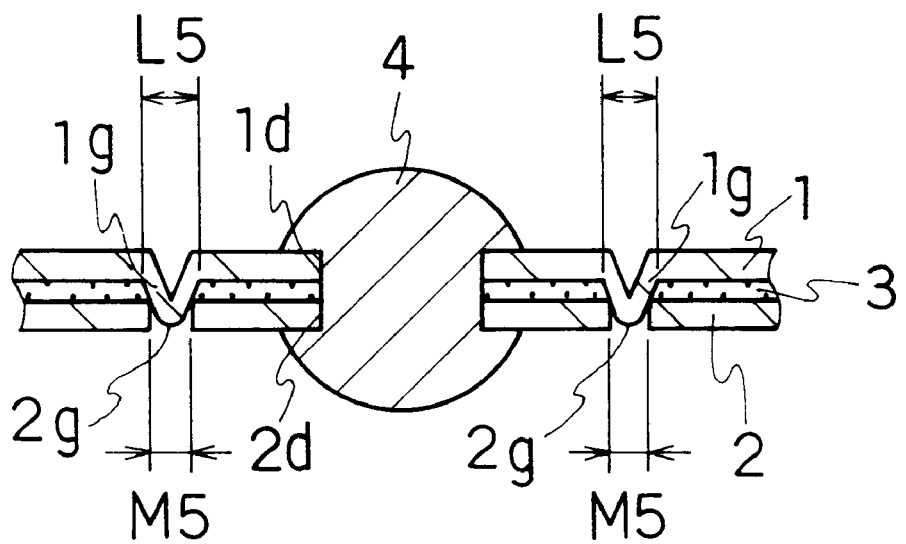
FIG. 36 is a sectional view explaining a method of jointing for preparation of a bonded assembly of the 28th Example of the present invention.

FIG. 36 is a sectional view showing an essential part of the bonded assembly of the 28th Example of the present invention. In this Example, the convexed portion 1g is formed on one board 1, and the through hole 2g to be engaged with the convexed portion 1g is formed on another board 2. Also the through holes 1d and 2d are formed on the portions other than the engaged portion of the convexed portion 1g with the through hole 2g in order to fasten the rivets there. The thickness of the adhesive layer is secured by making the diameter (M5) of the through hole 2g being smaller than the width (L5) of the convexed portion 1g.

According to this bonded assembly, the sizes of the convexed portion 1g and through hole 2g can be made smaller as compared with the case of fastening the rivet in the engaged portion, thereby making processing of the board easy.

This example shows the case where the convexed portion 1g is engaged with the through hole 2g, but the concaved portion may be used instead of the through hole.

Figure 37:
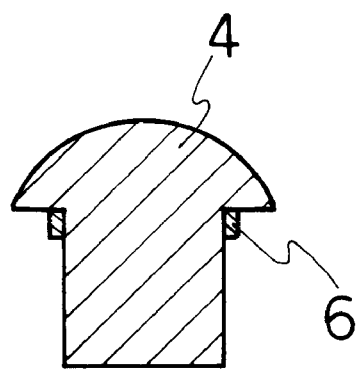
FIG. 37 is a sectional view showing a rivet of the 29th Example of the present invention.

FIG. 37 is a sectional view showing a rivet of the 29th Example of the present invention, and FIG. 38 is a sectional view explaining a method of jointing for preparation of the bonded assembly using the rivet of FIG. 37. The rivet 4 has means for fitting and temporarily fixing to the inserting through hole. In this Example, the elastic member 6 is covered on the shank under the head of the rivet. As the elastic members, there are used rubbers, coatings, adhesives, plastics, and the like which can be formed easily.

Figure 38A:
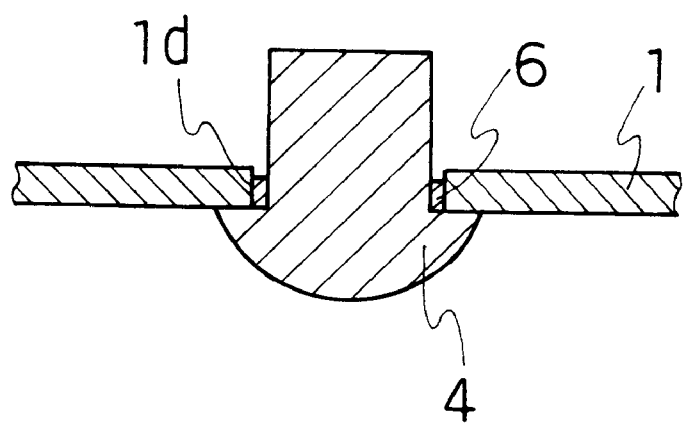
FIGS. 38(a) and 38(b) are sectional views explaining a method of jointing for preparation of a bonded assembly of the 29th Example of the present invention.
Figure 38B:
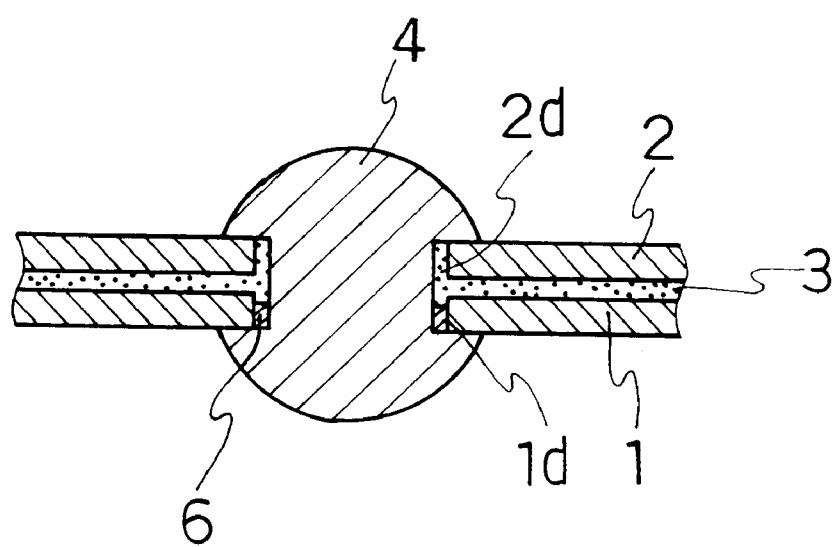

Then the method of jointing is explained below. As shown in FIG. 38(a), the rivet 4 is pushed in the rivet inserting through hole 1d of the board 1. In that case, the rivet 4 is temporarily fixed to the hole 1d of the board 1 by means of the elastic member 6 in the state not to be off from the hole. Then the adhesive 3 is coated on the bonding surface of the board 1 with the rivet 4 temporarily fixed thereto or another board 2 having the rivet inserting through hole 2d. The rivet 4 inserted and fixed to the board 1 is then inserted in the through hole 2d of another board 2, and fastened to obtain the bonded assembly as shown in FIG. 38(b).

This Example assures easy alignment as compared with the case where the rivet is inserted and fastened after coating of the adhesive 3, and as shown in FIG. 38, the rivet 4 does not drop even when inserted from below, thus giving an effect such as easy joint works.

FIG. 38 shows an example of fastening a rivet at the flat surface of the board for easy understanding, but this method of jointing for preparation can also be applied in the case where the rivet is used for engaging of the convexed and concaved portions. This is the same as in the following Examples.

Figure 39A:
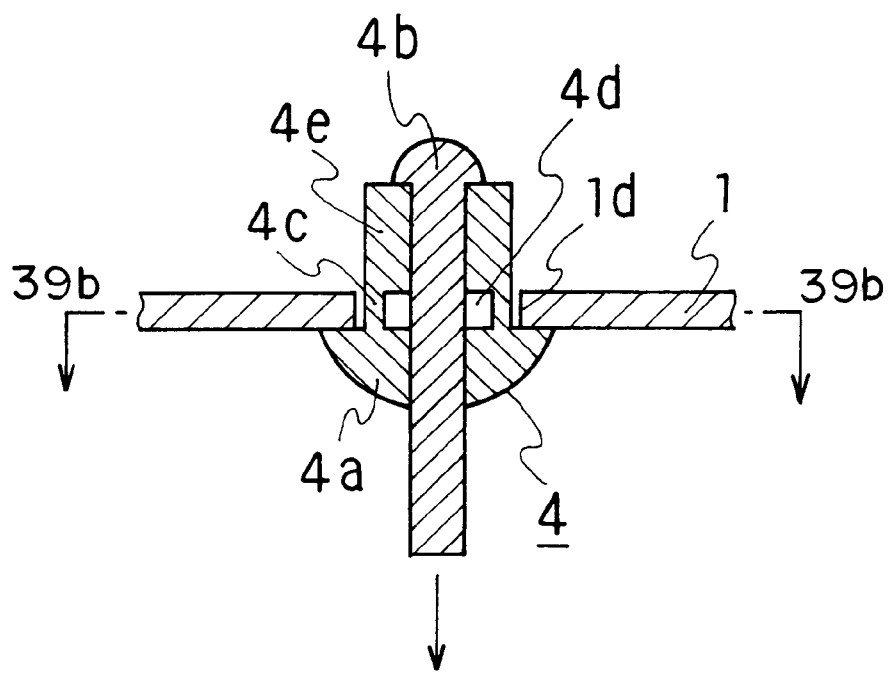
FIGS. 39(a) and 39(b) show a rivet of the 30th Example of the present invention.
Figure 39B:
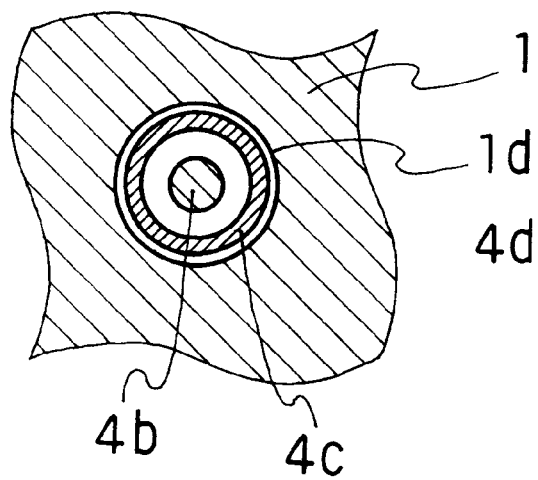
Figure 40A:
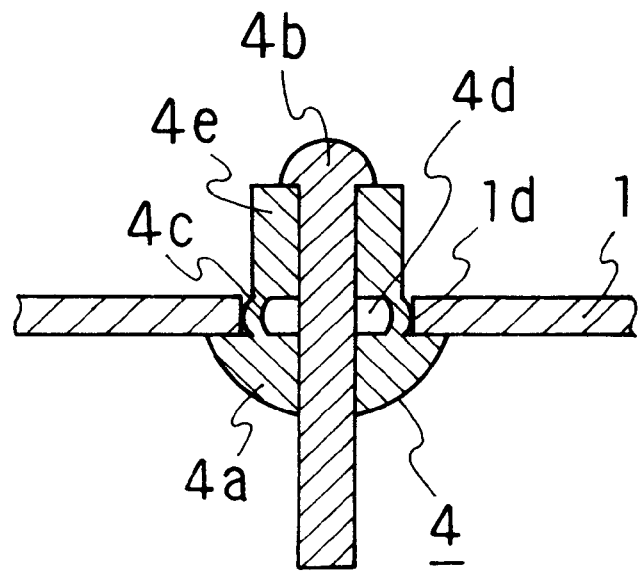
FIGS. 40(a) and 40(b) relate to the 30th Example of the present invention and are sectional views explaining a method of jointing for preparation of a bonded assembly using the rivet shown in FIGS. 39(a) and 39(b).

FIG. 39 shows a rivet of the 30th Example of the present invention. FIG. 39(a) is a longitudinal section, and FIG. 39(b) is a cross-section A—A of FIG. 39(a). FIG. 40 is a sectional view explaining a method of jointing of the bonded assembly using the rivet shown in FIG. 39. The rivet 4 has means for fitting and temporarily fixing to the inserting through hole. In this Example, a hollow 4d is provided at the fitting portion 4c under the head of the rivet, and a wall thickness of this portion near the head of the rivet is thinner than that at the end of the rivet. The portion 4c expands as shown in FIG. 40(a) by slightly pulling up the mandrel 4b, and the rivet can be temporarily fixed in the rivet inserting through hole 1d, thus surely fixing the rivet temporarily in the through hole.

Figure 40B:
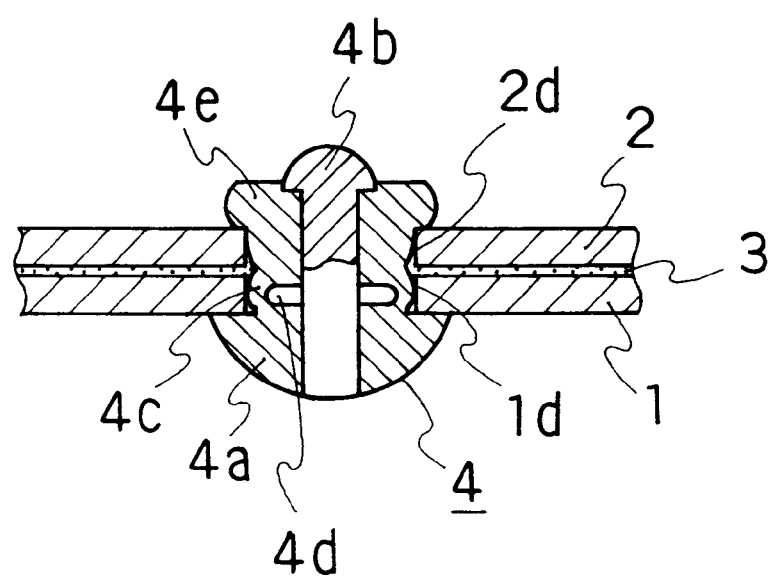

The method of jointing of the bonded assembly is then explained below. As shown in FIG. 39(a), the rivet 4 is inserted in the rivet inserting through hole 1d of the board 1, and the mandrel 4b is slightly pulled to expand the hollowed portion 4C as shown in FIG. 40(a). Thus the rivet 4 is temporarily fixed to the rivet inserting through hole not to be pulled out easily. Then the adhesive 3 is coated on the bonding surface of the board 1 with the rivet 4 temporarily fixed thereto or on another board 2 having the rivet inserting through hole 2d, and the rivet 4 fixed to the board 1 is then inserted in the rivet inserting through hole 2d on another board 2. Afterwards the mandrel 4b is further pulled to fasten the rivet 4 and obtain the bonded assembly as shown in FIG. 40(b).

According to this example, as compared with the case of inserting and fastening the rivet 4 after coating of adhesives 3, alignment of the boards is easy, and as shown in FIG. 40, the rivet 4 does not drop even if inserted from below, thus giving an effect such as easiness of joint works.

Figure 41:
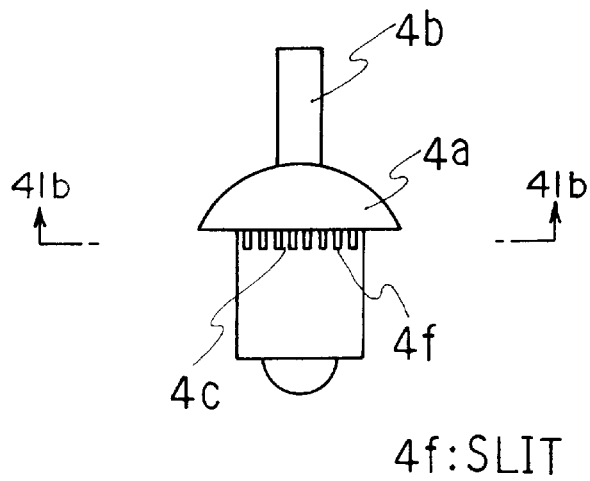
FIGS. 41(a) and 41(b) relate to the 31th Example of the present invention and are sectional views explaining a method of jointing for preparation of a bonded assembly using the rivet shown in FIGS. 41(a) and 41(b).
Figure 41:
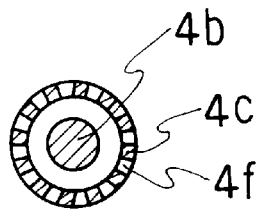

FIG. 41 shows the rivet of the 31st Example of the present invention. FIG. 41(a) is a front view of the rivet and FIG. 41(b) is a cross-section A—A of FIG. 40(a). In this Example, the slits 4f are provided instead of the hollow 4d in the form of a ring of the 30th Example, in order to form a thin wall portion to be pressed and expanded in the thickness direction thereof.

The above-mentioned rivet 4 can be used for jointing of the bonded assembly in the same manner as in the 29th and 30th Examples, and the like effect can be obtained.

Figure 42:
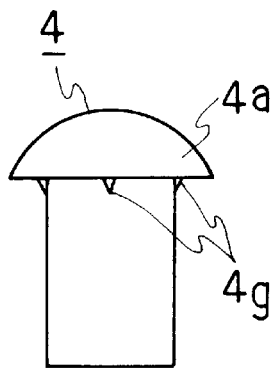
FIG. 42 is a sectional view of a rivet of the 32nd Example of the present invention.
Figure 43:
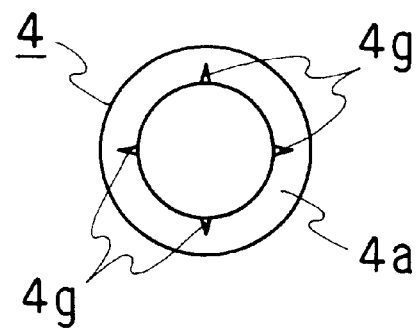
FIG. 43 is a bottom view of a rivet of the 32nd Example of the present invention.

FIGS. 42 and 43 are a front view and a bottom view respectively of the rivet of the 32nd Example of the present invention. In this Example, wedged projections 4g are provided on the rivet instead of the elastic member 6 of the rivet of the 29th Example, and the like effect can be obtained.

The number of projections 4g required may be at least one.

Also, instead of the projections 4g, rough surface may be formed by knurling.

Figure 44:
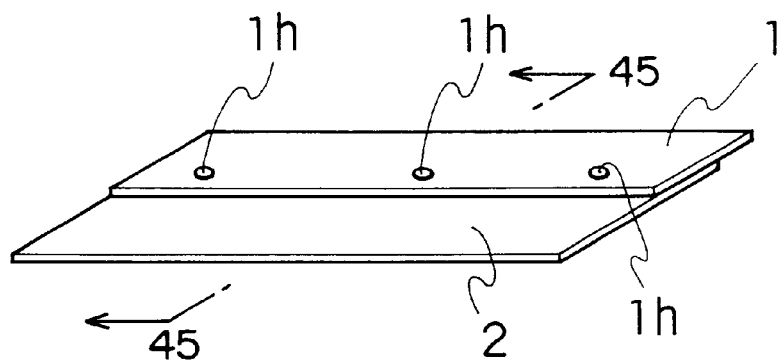
FIG. 44 is a perspective view of a rivet of the 33rd Example of the present invention.
Figure 45:
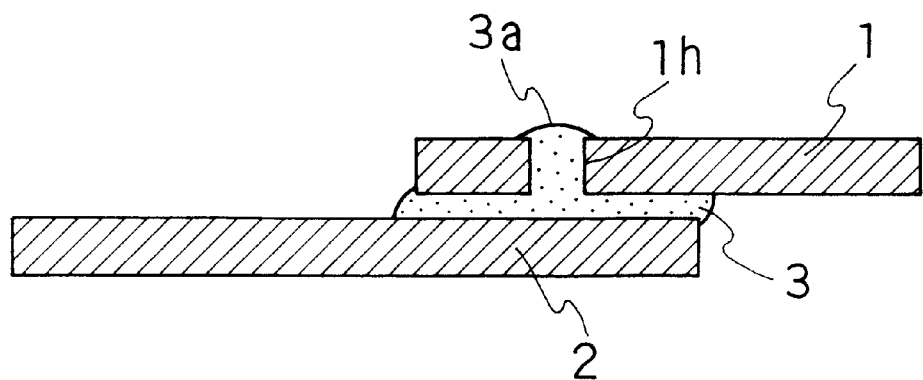
FIG. 45 is a section A—A of FIG. 44 showing a bonded assembly of the 33rd Example of the present invention.
Figure 46:
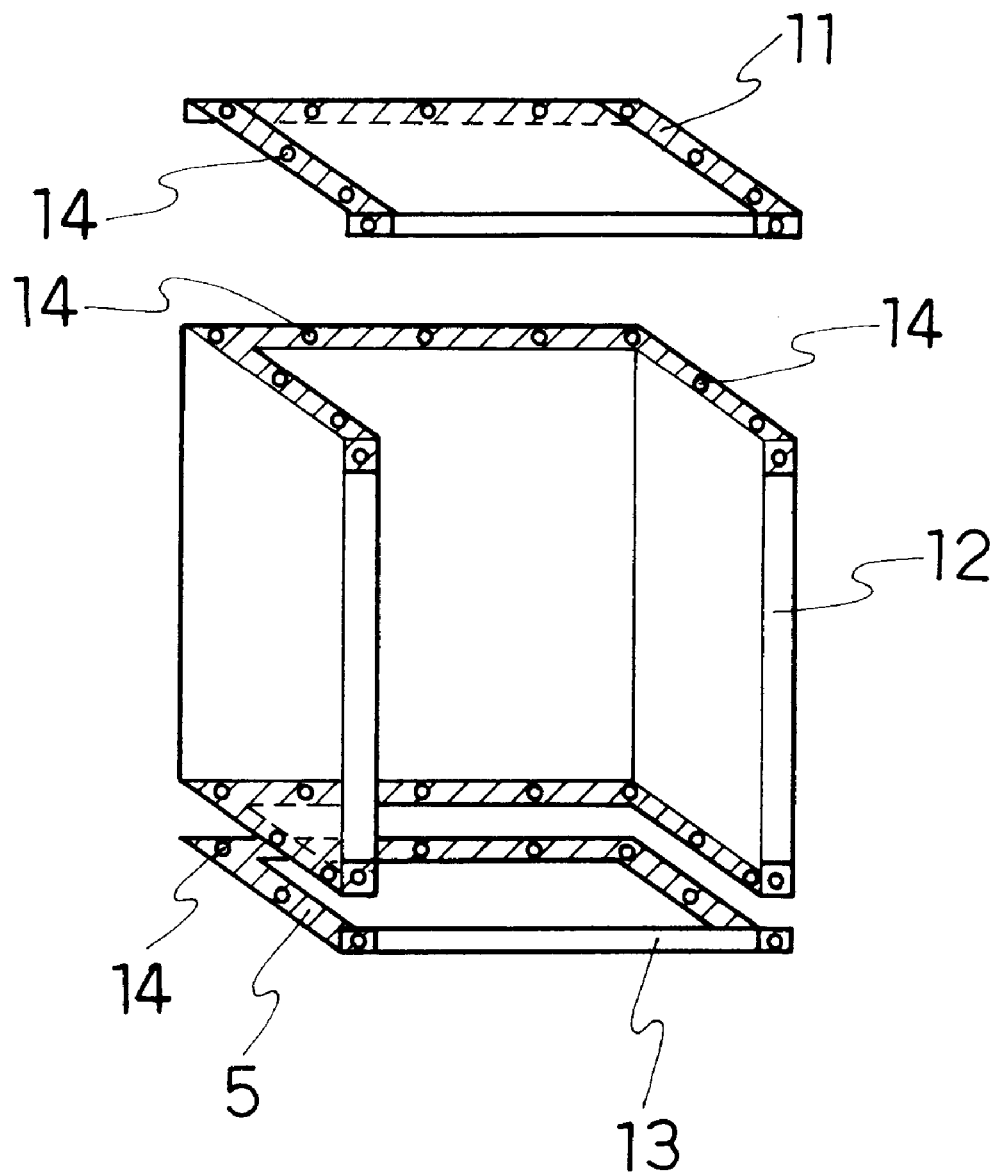
FIG. 46 is an exploded perspective view showing an assembly of the conventional control panel.
Figure 47A:
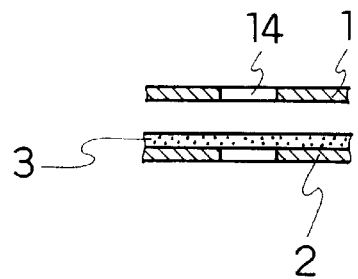
FIGS. 47(a), 47(b) 47(c) and 47(d) sectional views explaining a conventional method of jointing.
Figure 47B:
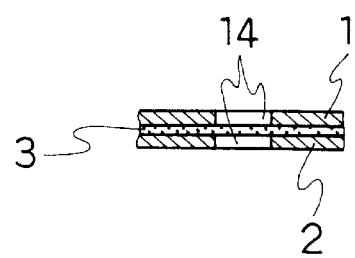
Figure 47C:
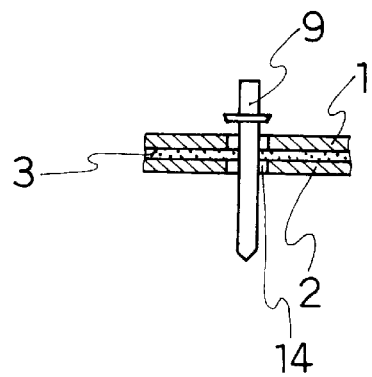
Figure 47D:
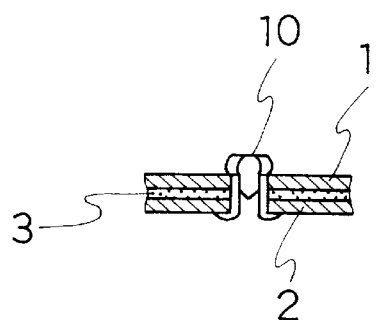

FIGS. 44 and 45 show the bonded assembly of the 33rd Example of the present invention. FIG. 44 is a perspective view, and FIG. 45 is a cross-section A—A of FIG. 44. In this Example, in order to make it easy to see the coating position of adhesives 3 and confirm that the adhesives 3 have been coated on the coating positions, there is provided at least one small through hole 1h on at least one coating position of two boards 1 and 2 to be bonded with the adhesive 3. The through hole 1h is used as a mark for coating, and the coated conditions of the adhesives can be confirmed by the adhesive 3a flowing out of the through hole 1h after bonding the boards.

The adhesive used in Examples 1 to 33 of the present invention is a two liquid type modified acrylic adhesive "HARDLOCK® M372" (available from Denki Kagaku Kogyo Kabushiki Kaisha). Similar adhesives such as "HARDLOCK® C372", "HARDLOCKR® C355" and "HARDLOCK® C370" are also applicable.

This Example may be executed alone or in combination with each of Examples 1 to 32.

The present invention can provide a highly reliable bonded assembly, a method of jointing therefor and rivets useful for jointing, which assure easy and accurate alignment of boards, secure the adhesive layer thickness required, prevent the adhesives from adhering to unnecessary portions and increase the strength of the bonded assembly.

What we claim is:

1. A bonded assembly comprising:
    a first board having a convexed portion on a jointing surface thereof, said convexed portion having a concave region for keeping adhesives therein;
    a second board having a concaved portion on a jointing surface thereof to be engaged with said convexed portion; and
    adhesives interposed between the first and second boards for jointly fastening said first and second boards;
    wherein said concave region is provided on a top flat surface of the convexed portion; and
    a height of the convexed portion is larger than a depth of the concaved portion to secure a thickness of an adhesive layer between the first and the second boards.

2. The bonded assembly of claim 1, wherein the concave region has a bank for keeping adhesive therein.

3. The bonded assembly of claim 1, wherein the first board is bonded in parallel with the second board.

* * * * *